(12) United States Patent
Takeshita et al.

(10) Patent No.: US 11,463,344 B2
(45) Date of Patent: Oct. 4, 2022

(54) CONTROL DEVICE, CONTROL METHODS AND PROGRAMS

(71) Applicant: NIPPON TELEGRAPH AND TELEPHONE CORPORATION, Tokyo (JP)

(72) Inventors: Erina Takeshita, Musashino (JP); Akihiro Morita, Musashino (JP); Hideaki Kimura, Musashino (JP); Go Yazawa, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 53 days.

(21) Appl. No.: 17/268,161

(22) PCT Filed: Aug. 13, 2019

(86) PCT No.: PCT/JP2019/031831
§ 371 (c)(1),
(2) Date: Feb. 12, 2021

(87) PCT Pub. No.: WO2020/036175
PCT Pub. Date: Feb. 20, 2020

(65) Prior Publication Data
US 2021/0203585 A1 Jul. 1, 2021

(30) Foreign Application Priority Data

Aug. 14, 2018 (JP) .............................. JP2018-152557

(51) Int. Cl.
*H04L 45/02* (2022.01)
*H04L 12/46* (2006.01)
(Continued)

(52) U.S. Cl.
CPC .......... *H04L 45/02* (2013.01); *H04L 12/4641* (2013.01); *H04L 41/0654* (2013.01); *H04L 43/0811* (2013.01)

(58) Field of Classification Search
None
See application file for complete search history.

(56) References Cited

U.S. PATENT DOCUMENTS 8,599,822 B2 * 12/2013 Castagnoli .............. H04L 45/60
709/239
2003/0079082 A1 * 4/2003 Sicola ................... G06F 3/0601
711/170

(Continued)

OTHER PUBLICATIONS

"An Overview of Operations, Administration, and Maintenance (OAM) Tools", literature, Jun. 2014.

(Continued)

*Primary Examiner* — Lonnie V Sweet

(57) ABSTRACT

Provided are a control apparatus, a control method, and a program capable of designing efficient end-to-end monitoring in a VPN infrastructure. The control apparatus according to the present invention controls end-to-end monitoring in a VPN infrastructure in which communications of a plurality of users are superimposed. The control apparatus includes a user end database 11 that stores information about customer edge apparatuses (CEs) for each of the users, each of the CEs serving as a monitoring end of end-to-end monitoring, an end-to-end path database 12 that stores information about all links included in a path between the CEs, and an end-to-end monitoring management unit 13 that sets a monitoring path for end-to-end monitoring to between the CEs so that combinations of the monitoring path passing through each of the links are coprime.

7 Claims, 9 Drawing Sheets

(51) Int. Cl.
    *H04L 41/0654*     (2022.01)
    *H04L 43/0811*     (2022.01)

(56) References Cited

U.S. PATENT DOCUMENTS

| | | | |
|---|---|---|---|
| 2006/0215582 A1* | 9/2006 | Castagnoli | H04L 45/02 370/254 |
| 2006/0215583 A1* | 9/2006 | Castagnoli | H04W 74/04 370/254 |
| 2010/0034098 A1 | 2/2010 | Wang et al. | |
| 2011/0103236 A1* | 5/2011 | Li | H04J 13/0077 370/479 |
| 2017/0118752 A1* | 4/2017 | Chen | G06Q 30/0241 |
| 2020/0053002 A1* | 2/2020 | Heidelberger | H04L 45/14 |

OTHER PUBLICATIONS

"Layer 2 Virtual Private Network (L2VPN) Operations, Administration, and Maintenance (OAM) Requirements and Framework", literature, Mar. 2011.
Liang MA, et al., "Monitor placement for maximal identifiability in network tomography", IEEE INFOCOM, 2014.
Yao Zhao, et al., "Towards Efficient Large-Scale VPN Monitoring and Diagnosis under Operational Constraints", IEEE INFOCOM, 2009.
Atsuo Tachibana, et al., "Selecting End-to-end Measurement Paths for Efficient Monitoring on ISP Networks", IEICE Technical Report, vol. 111, No. 202, 2011, pp. 7-12.

\* cited by examiner

| USER | END |
|---|---|
| USER #1 | CE #1_1 |
| | CE #1_2 |
| | CE #1_3 |
| | CE #1_4 |
| USER #2 | CE #2_1 |
| | CE #2_2 |
| | CE #2_3 |
| | CE #2_4 |

| END | | PASSED LINK |
|---|---|---|
| src | dst | |
| CE #1_1 | CE #1_2 | LINK #1, LINK #2, LINK #6, LINK #8 |
| CE #1_1 | CE #1_3 | LINK #1, LINK #3, LINK #5, LINK #6, LINK 10 |
| CE #1_1 | CE #1_4 | LINK #1, LINK #4, LINK #5, LINK #6, LINK 12 |
| ... | | |

Fig. 10

| PARAMETER | DEFINITION |
|---|---|
| $U$ | SET OF USERS |
| $V$ | SET OF CES FOR EACH USER. $V_i$ BEING SET OF CES OF USER$_i$ |
| $E$ | SET OF LINKS |
| $\tilde{E}$ | SET OF LINKS CONNECTING ONLY TO NODES OF DEGREE 2 OR LESS |
| $R$ | ROUTING MATRIX BETWEEN CES. $R_{i,j}$ IS 1 IF PATH FROM CE$_i$ TO CE$_j$ PASSES THROUGH LINK$_k$ AND OTHERWISE 0 |
| $b$ | UPPER LIMIT FOR NUMBER OF MONITORING ENDS IN EACH CE. $b_i$ IS UPPER LIMIT NUMBER OF MONITORING ENDS IN CE$_i$ |
| $x$ | VARIABLE INDICATING BETWEEN WHICH CES TO PERFORM END-TO-END MONITORING. $x_{i,j}$ IS 1 IF MONITORING IS PERFORMED AT MONITORING END IN CE$_i$ AND MONITORING END IN CE$_j$, AND OTHERWISE 0 |
| $X$ | END-TO-END MONITORING ROUTING MATRIX DETERMINED FROM $x$ AND $R$. $X_{i,j}$ IS 1 IF MONITORING PATH FROM MONITORING END IN CE$_i$ TO MONITORING END IN CE$_j$ PASSES THROUGH LINK$_k$ AND OTHERWISE 0 |

Fig. 11

| END-TO-END MONITORING | END PAIR |
|---|---|
| #1 | CE #1_1 |
|  | CE #1_3 |
| #2 | CE #1_2 |
|  | CE #1_4 |
| #3 | CE #2_1 |
|  | CE #2_2 |
| #4 | CE #2_2 |
|  | CE #2_3 |
| #5 | CE #2_3 |
|  | CE #2_4 |

Fig. 12

| MONITORING PATH | END PAIR | PASSED LINK |
|---|---|---|
| #1 | CE #1_1 <br> CE #1_3 | LINK #1, LINK #3, LINK #5 |
| #2 | CE #1_2 <br> CE #1_4 | LINK #2, LINK #4, LINK #5 |
| #3 | CE #2_1 <br> CE #2_2 | LINK #1, LINK #2 |
| #4 | CE #2_2 <br> CE #2_3 | LINK #2, LINK #3, LINK #5 |
| #5 | CE #2_3 <br> CE #2_4 | LINK #3, LINK #4 |

Fig. 13

| LINK \ MONITORING PATH | #1 | #2 | #3 | #4 | #5 |
|---|---|---|---|---|---|
| Link_1 | ○ |  | ○ |  |  |
| Link_2 |  | ○ | ○ | ○ |  |
| Link_3 | ○ |  |  | ○ | ○ |
| Link_4 |  | ○ |  |  | ○ |
| Link_5 | ○ | ○ |  | ○ |  |

Fig. 14

EXPRESSIONS A

OBJECTIVE FUNCTION:

$$\arg\min_{x_{i,j}} \sum_{u \in U} \sum_{i,j \in V_u, i \neq j} x_{i,j} \quad \text{EXPRESSION 1}$$

CONSTRAINT CONDITIONS:

$\sum_{j \in V_u, i \neq j} x_{i,j} \geq 1 \quad \forall i \in V_u, \forall u \in U$     EXPRESSION 2

$\sum_{j \in V_u, i \neq j} x_{i,j} \leq b_i \quad \forall i \in V_u, \forall u \in U$     EXPRESSION 3

$x_{i,j} = x_{j,i} \quad\quad\quad \forall i,j \in V_u, \forall u \in U$     EQUATION 4

$x_{i,j} \in \{0,1\} \quad\quad \forall i,j \in V_u, \forall u \in U$     EXPRESSION 5

$X_{i,j,e} = R_{i,j,e} \cdot x_{i,j} \quad \forall i,j \in V_u, \forall u \in U, \forall e \in E \setminus \bar{E}$     EQUATION 6

$\text{rank}(X) = |E \setminus \bar{E}|$     EQUATION 7

Fig. 15

CONTROL DEVICE, CONTROL METHODS AND PROGRAMS

CROSS-REFERENCE TO RELATED APPLICATIONS

This application is a 371 U.S. National Phase of International Application No. PCT/JP2019/031831, filed on Aug. 13, 2019, which claims priority to Japanese Application No. 2018-152557 filed on Aug. 14, 2018. The entire disclosures of the above applications are incorporated herein by reference.

TECHNICAL FIELD

The present disclosure relates to a control apparatus, a control method, and a program for controlling end-to-end monitoring in a virtual private network (VPN) infrastructure in which communications of a plurality of users are superimposed.

BACKGROUND ART

In a VPN service, a communications provider provides a virtual dedicated network to users. The communications provider connects a local area network (LAN) being a network of each of the users, via a VPN infrastructure of the communications provider, in order to provide the VPN service. The user network and the VPN infrastructure are connected by an edge apparatus CE (customer edge) managed by the user and an edge apparatus PE (provider edge) managed by the provider.

FIG. 1 illustrates an example of a VPN infrastructure. The VPN infrastructure includes PEs and a relay device P that relays between the PEs. Further, a capsuling technology (such as PBB, VxLAN, and MPLS) is employed by the communications provider to efficiently transfer a plurality of users collectively in the VPN infrastructure. In the capsuling technology, a header of a packet and the entire payload thereof are used as a payload portion of a new layer, and another header is newly applied to the payload portion. The PE in the VPN infrastructure employing the capsuling technology can apply a capsuling header to a user packet to perform a process of collectively transferring traffic of a plurality of users. Further, in the relay device P, the traffic is transferred based on a header provided according to the capsuling technology, and thus, it is possible to perform a transfer process without distinguishing the users.

In the VPN infrastructure, end-to-end monitoring is performed between any CEs by an OAM tool (such as ICMP Ping and Ether-CC) to monitor user communication (1.1. Background in NPL 1, 4.2, and OAM Domains in NPL 2). If end-to-end monitoring is performed between all CEs, all user communications can be easily monitored and all link states can be easily grasped, and thus, the monitoring performance is improved. On the other hand, if end-to-end monitoring is performed between all CEs, the number of monitoring ends for each of the CEs increases, and thus, a load of the monitoring process in the CE increases. This results in a problem that a processing amount required for an end-to-end monitoring path in a relay network increases, and thus, an amount of resources required for the monitoring increases. Thus, the monitoring performance and the amount of resources required for the monitoring are in a trade-off relationship.

Thus, an end-to-end monitoring design is widely studied in which locations of users between which to perform end-to-end monitoring are determined to efficiently grasp a state of a network with a minimum amount of resources. For example, a previous study (NPL 3) in which a general network rather than a VPN infrastructure is assumed proposes an end-to-end monitoring design method for grasping a link state with a minimum number of monitoring ends. In end-to-end monitoring know in the art, end-to-end monitoring is designed for every user to constantly confirm that every user communication is in a normal state.

CITATION LIST

Non Patent Literature

NPL 1: An Overview of Operations, Administration, and Maintenance (OAM) Tools (RFC 7276)
NPL 2: Layer 2 Virtual Private Network (L2VPN) Operations, Administration, and Maintenance (OAM) Requirements and Framework (RFC6136)
NPL 3: L. Ma, T. He, K. K. Leung, A. Swami, and D. Towsley, "Monitor placement for maximal identifiability in network tomography," in Proc. of IEEE INFOCOM, 2014
NPL 4: Y. Zhao, Z. Zhu, Y. Chen, D. Pei, and J. Wang. Towards Efficient Large-Scale VPN Monitoring and Diagnosis under Operational Constraints. In Proc. IEEE INFOCOM, 2009.

SUMMARY OF THE INVENTION

Technical Problem

If the capsuling technology is employed in a VPN infrastructure, the relay device P performs a transfer process without identifying a user. Thus, in a VPN infrastructure using the capsuling technology, if end-to-end monitoring is designed for every user as known in the art, the relay device P will transfer even traffic of end-to-end monitoring between different CEs in an identical transfer process.

An example in which end-to-end monitoring is designed for every user will be described with reference to FIGS. 2 to 4.

FIG. 2 illustrates a setting example of end-to-end monitoring for a user 1. In the present setting example, end-to-end monitoring is performed between a CE #1_1 and CEs #1_2 to 1_4. Further, FIG. 3 illustrates a setting example of end-to-end monitoring for a user 2. In the present setting example, end-to-end monitoring is performed between a CE #2_4 and CEs #2_1 to 2_3. Thus, end-to-end monitoring is designed for every user (designing which CEs to perform end-to-end monitoring with).

FIG. 4 is an example in which end monitoring for every user known in the art is set to a VPN infrastructure. If the capsuling technology is employed in a relay network, the relay device P performs a transfer process without identifying the user 1 and the user 2. This causes a duplication of end-to-end monitoring, and thus, the monitoring process is inefficient. That is, there is a problem in that it is difficult to grasp a state of a link with a minimum number of monitoring ends in the end monitoring for every user in the VPN infrastructure.

To solve the problems mentioned above, an object of the present invention is to provide a control apparatus, a control method, and a program capable of designing efficient end-to-end monitoring in a VPN infrastructure.

Means for Solving the Problem

To achieve the object described above, a control apparatus according to the present invention performs end-to-end monitoring design in a coordinated manner among a plurality of users, rather than performing end-to-end monitoring for each of the users.

Specifically, the control apparatus according to the present invention is a control apparatus for controlling an end-to-end monitoring in a virtual private network (VPN) infrastructure in which communications of a plurality of users are superimposed. The control apparatus includes
a user end database that stores information about customer edge apparatuses (CEs) for each of the plurality of users, the customer edge apparatuses (CEs) serving as monitoring ends of the end-to-end monitoring,
an end-to-end path database that stores information about all of first links included in a path between the CEs, and
an end-to-end monitoring management unit configured to set a monitoring path for the end-to-end monitoring to between the CEs so that a combination of the monitoring path passing through each of the first links are coprime.

Further, a control method according to the present invention is a control method for controlling an end-to-end monitoring in a VPN infrastructure in which communications of a plurality of users are superimposed. The control method includes
using, by an end-to-end monitoring management unit, information about CEs for each of the plurality of users, the CEs serving as monitoring ends of the end-to-end monitoring, stored in a user end database and information about all of first links included in a path between the CEs stored in an end-to-end path database to set a monitoring path for the end-to-end monitoring to between the CEs so that a combination of the monitoring path passing through each of the first links are coprime.

In the present control apparatus and the present control method, combinations of a monitoring path passing through each of the links in a monitored network are coprime, and thus, it is possible to prevent a duplication of end-to-end monitoring, and design efficient end-to-end monitoring with further reduced resources. Consequently, the present invention can provide a control apparatus and a control method capable of designing efficient end-to-end monitoring in a VPN infrastructure.

The end-to-end monitoring management unit of the control apparatus according to the present invention includes receiving, from the CEs serving as the monitoring ends, end-to-end monitoring state information indicating whether the monitoring path is disconnected to perform an identification of a failed link and a user affected by the failed link, based on the combination of the monitoring path that is disconnected.

Further, the control method according to the present invention further includes receiving, from the CEs serving as the monitoring ends, end-to-end monitoring state information indicating whether the monitoring path is disconnected to perfrom an identification of a failed link and a user affected by the failed link, based on the combination of the monitoring path that is disconnected.

In the present control apparatus and the present control method, the combinations of a monitoring path passing through each of the links in the monitored network are coprime, and thus, it is possible to identify a failed link from a combination of the disconnected monitoring path to improve a monitoring performance without setting end-to-end monitoring between all the CEs.

The end-to-end monitoring management unit of the control apparatus according to the present invention includes a monitoring end calculation unit configured to calculate end pairs being combinations of the CEs between which the end-to-end monitoring is performed, so to satisfy an upper limit of the number of monitoring ends to store the end pairs in an end-to-end monitoring database,
an end-to-end monitoring path calculation unit configured to calculate, based on information about the first links stored in the end-to-end path database and information about the end pairs stored in the end-to-end monitoring database, second links included in the monitoring path being a path between each of the end pairs, for each of the end pairs to store the second links in an end-to-end monitoring path database,
an end-to-end monitoring setting unit configured to set, based on information about the second links included in the monitoring path stored in the end-to-end monitoring database, an end-to-end monitoring to each of the CEs so that the combination of the monitoring path passing through each of the second links are coprime, and
an end-to-end monitoring result processing unit configured to achieve the identification by comparing the end-to-end monitoring state information, information about the CEs stored in the user end database, and information about the second links included in the monitoring path stored in the end-to-end monitoring path database.

Further, the monitoring path setting procedure of the control method according to the present invention includes calculating end pairs being combinations of the CEs between which the end-to-end monitoring is performed, so to satisfy an upper limit of the number of monitoring ends to store the end pairs in an end-to-end monitoring database,
calculating, based on information about the first links stored in the end-to-end path database and information about the end pairs stored in the end-to-end monitoring database, second links included in the monitoring path being a path between each of the end pairs, for each of the end pairs to store the second links in an end-to-end monitoring path database, and
setting, based on information about the second links included in the monitoring path stored in the end-to-end monitoring database, an end-to-end monitoring to each of the CEs so that the combination of the monitoring path passing through each of the second links are coprime, in which the identification includes comparing the end-to-end monitoring state information, information about the CEs stored in the user end database, and information about the second links included in the monitoring path stored in the end-to-end monitoring path database.

Further, a program according to the present invention causes a computer to function as the control apparatus. The present control apparatus can also be implemented by a computer and a program, and the program can be recorded in a recording medium or provided through a network.

Effects of the Invention

The present invention can provide a control apparatus, a control method, and a program capable of designing efficient end-to-end monitoring in a VPN infrastructure.

BRIEF DESCRIPTION OF DRAWINGS

FIG. 10 is an example of information stored in an end-to-end path database.

FIG. 11 is a diagram for describing parameters used by the control apparatus according to the present invention.

FIG. 12 is an example of information stored in an end-to-end monitoring database.

FIG. 13 is an example of information stored in an end-to-end monitoring path database.

FIG. 14 is a diagram for describing a principle that a link is identified from a monitoring path.

FIG. 15 is a diagram for describing a calculation expression used by the control apparatus according to the present invention to set a monitoring path.

DESCRIPTION OF EMBODIMENTS

Hereinafter, embodiments of the present disclosure will be described with reference to the drawings. The embodiments described below are examples of the present disclosure, and the present disclosure is not limited to the following embodiments. In this specification and the drawings, constituent elements having the identical reference signs are assumed to be the same.

Conditions to be Considered

Conditions (A) to be considered in designing end-to-end monitoring in a coordinated manner among a plurality of users will be described.

Conditions (A)

I) Every CE always monitors at least one user communication to monitor communication of every user.

Ii) An upper limit of the number of monitoring ends for every CE is provided to limit concentration of the monitoring ends over some CEs.

iii) End-to-end monitoring is designed so that combinations of end-to-end monitoring paths through which a link is passed are different for every link to allow for identification of a link state from a result of the end-to-end monitoring paths.

That is, the conditions (A) includes an upper limit of monitoring resources and a condition in which any link state can be identified from an end-to-end monitoring result. Consequently, it is necessary to realize end-to-end monitoring that achieves an object of end-to-end monitoring in a VPN service, the object being that monitoring resources are reduced while the conditions (A) are considered.

In the present embodiment, a means for setting end-to-end monitoring in which monitoring resources are reduced while the conditions (A) are considered, and a means for determining a user affected by a change in a link state and a state of a certain link from a monitoring result of the designed end-to-end monitoring will be described. The means include a control apparatus and a control system that transmit and receive information to and from a VPN infrastructure being a network to be monitored, and manage the end-to-end monitoring.

Control Apparatus

Figure 6:
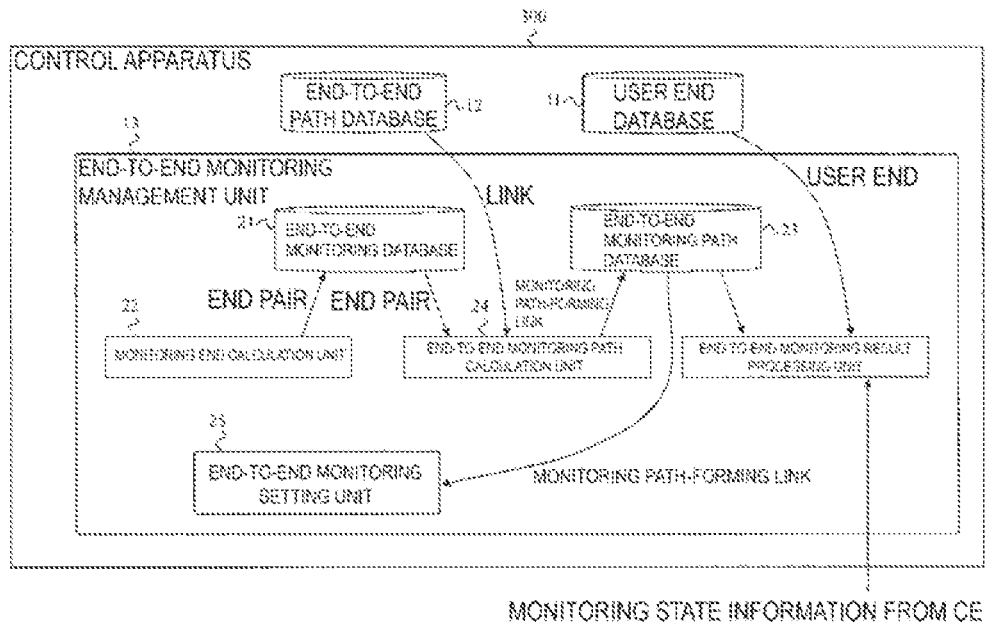
FIG. 6 is a diagram for describing the control apparatus according to the present invention.

FIG. 6 is a block diagram for describing a configuration of a control apparatus according to the present embodiment. The control apparatus according to the present embodiment controls end-to-end monitoring in a VPN infrastructure in which communications of a plurality of users are superimposed and includes a user end database 11, an end-to-end path database 12, and an end-to-end monitoring management unit 13. The user end database 11 stores information about customer edge apparatuses (CE) for each of the users, and each of the CEs is a monitoring end in the end-to-end monitoring. The end-to-end path database 12 stores information about all links included in a path between the CEs. The end-to-end monitoring management unit 13 sets a monitoring path for end-to-end monitoring between the CEs so that combinations of the monitoring path passing through each of the links are coprime.

The end-to-end monitoring management unit 13 includes an identification function of receiving, from each of the CEs serving as the monitoring end, end-to-end monitoring state information indicating whether the monitoring path is disconnected, and identifying a failed link and a user affected by the failed link, based on a combination of the disconnected monitoring path.

A specific configuration of the end-to-end monitoring management unit 13 is as follows. The end-to-end monitoring management unit 13 includes a monitoring end calculation unit 22 that calculates an end pair, being a combination of the CEs between which end-to-end monitoring is performed so to satisfy an upper limit of the number of monitoring ends, and stores the end pair in an end-to-end monitoring database 21, an end-to-end monitoring path calculation unit 24 that calculates, based on the information about links stored in the end-to-end path database 12 and information about the end pair stored in the end-to-end monitoring database 21, a link included in the monitoring path being a path between the end pairs, for each of the end pairs, and stores the link in an end-to-end monitoring path database 23, an end-to-end monitoring setting unit 25 that sets, based on information about the link included in the monitoring path stored in the end-to-end monitoring database 23, an end-to-end monitoring function for each of the CEs so that a combination of a monitoring path passing through each of the links is coprime, and an end-to-end monitoring result processing unit 26 that realizes the identification function by comparing the end-to-end monitoring state information, the information about the CEs stored in the user end database 11, and the information about the link included in the monitoring path stored in the end-to-end monitoring path database 23.

Based on the user end database 11 and the end-to-end path database 12, the monitoring end calculation unit 22 calculates a customer edge apparatus on which to arrange a monitoring end and customer edge apparatuses between which to perform end-to-end monitoring, so to reduce monitoring resources while the conditions A described above are satisfied.

The end-to-end monitoring database 21 stores information about the end-to-end monitoring calculated by the monitoring end calculation unit 22.

The end-to-end monitoring path calculation unit 24 calculates a path between the monitoring ends of each of the customer edge apparatuses based on the end-to-end path database 12 and the end-to-end monitoring database 21.

The end-to-end monitoring path database 23 stores information about the path between the monitoring ends of each of the customer edge apparatuses calculated by the end-to-end monitoring path calculation unit 24.

The end-to-end monitoring setting unit 25 sets end-to-end monitoring to each of the customer edge apparatuses of a network based on the information in the end-to-end monitoring database 21.

The end-to-end monitoring result processing unit 26 calculates a user affected by a change in a link state and a state of a certain link, based on the end-to-end monitoring state information received from the network, the user end database 11, and the end-to-end monitoring path database 23.

Communication System

Figure 5:
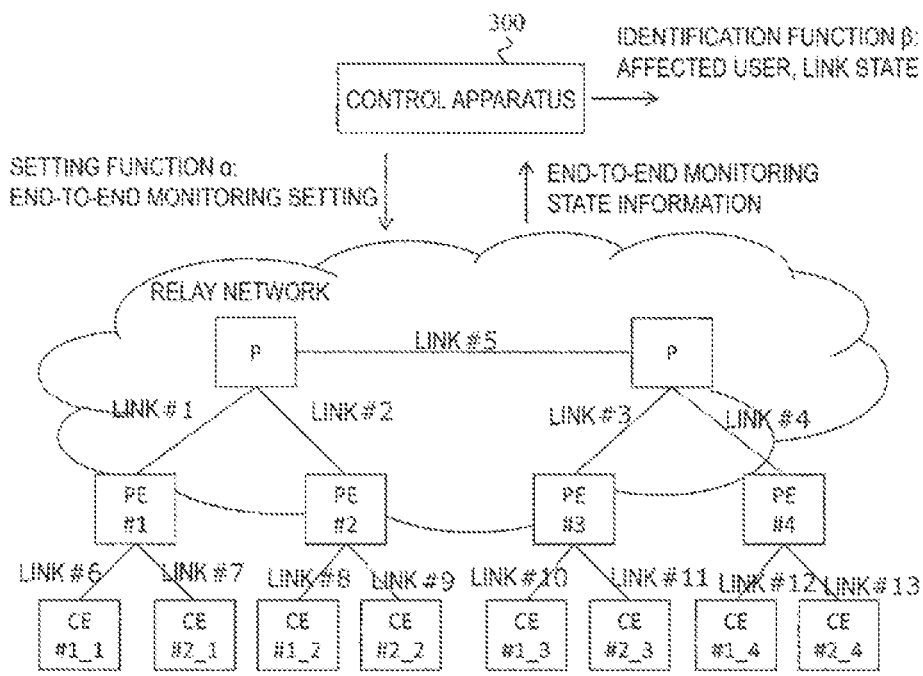
FIG. 5 is a diagram for describing a communication system including a control apparatus according to the present invention.

FIG. 5 is a diagram for describing a communication system of the present embodiment.

The present communication system is a VPN infrastructure in which a plurality of user communications are superimposed.

The present communication system includes
the user end database 11,
the end-to-end path database 12,
a setting function α, and
an identification function β. The user end database 11 stores information regarding customer edge apparatuses of every user. The end-to-end path database 12 stores information regarding a path between the customer edge apparatuses of the users. Based on the user end database 11 and the end-to-end path database 12, the setting function a calculates a customer edge apparatus on which to arrange a monitoring end and customer edge apparatuses between which to perform end-to-end monitoring, so to reduce monitoring resources while the conditions A described above are satisfied, and sets the calculated end-to-end monitoring to every customer edge apparatus in the network. The identification function β determines a user affected by a change in a link state and a state of a certain link, based on end monitoring state information received from the network and an end-to-end monitoring setting calculated by the setting function.

Below, the control apparatus and the control system according to the present embodiment will be described in detail with reference to the drawings.

Figure 1:
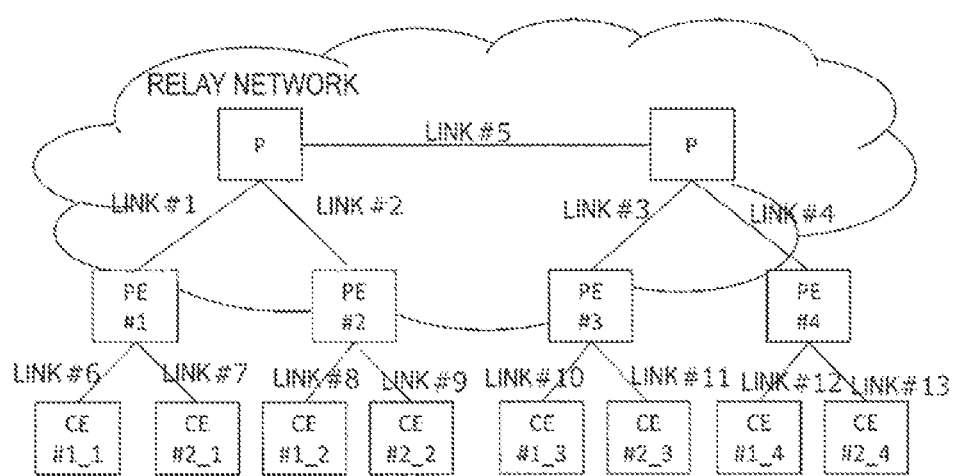
FIG. 1 is a diagram for describing a VPN infrastructure.
Figure 2:
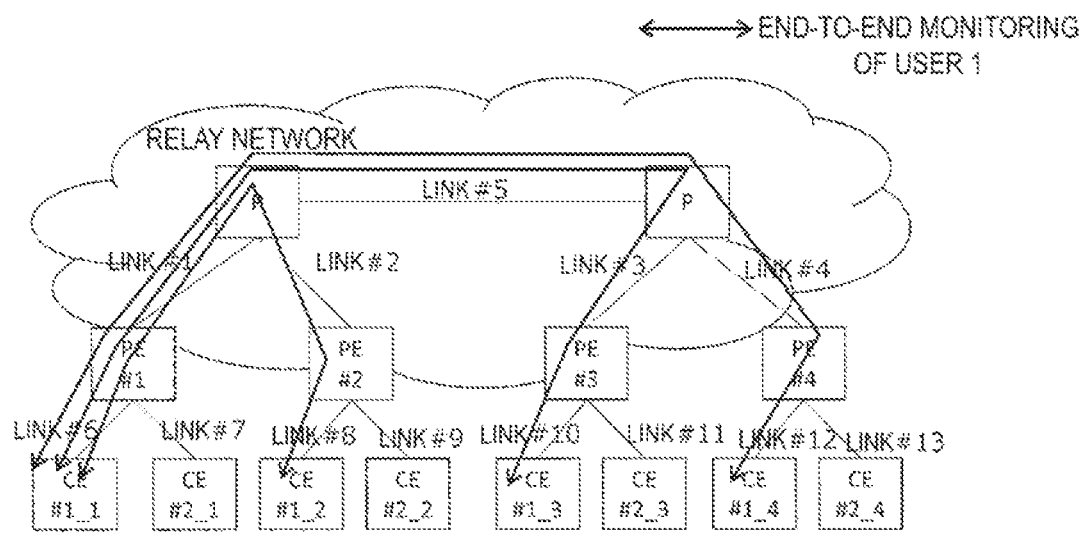
FIG. 2 is a diagram for describing end-to-end monitoring related to the present invention.
Figure 3:
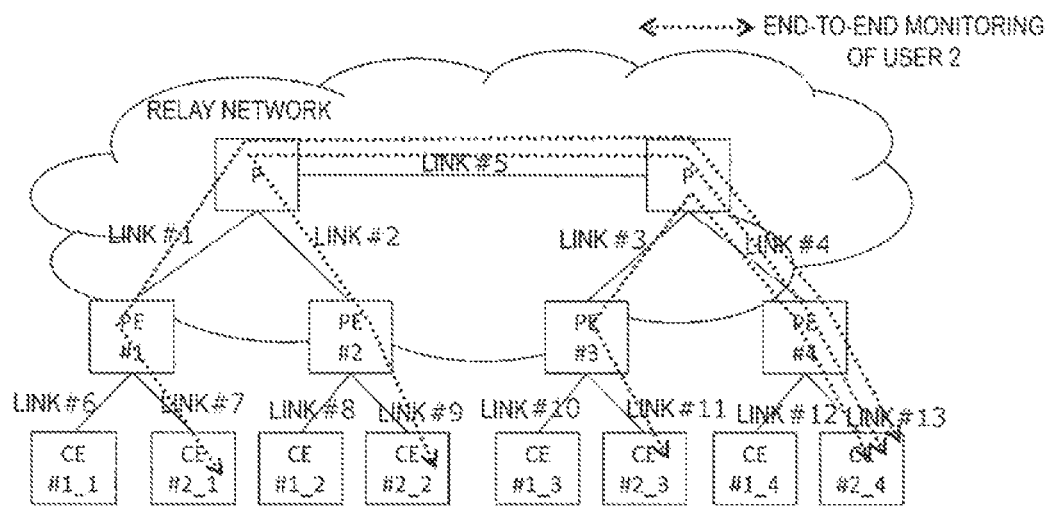
FIG. 3 is a diagram for describing end-to-end monitoring related to the present invention.

An example in which the present invention is applied to the VPN infrastructure of FIG. 1 is illustrated. The present communication system is a VPN infrastructure including a plurality of CEs, PEs connected to one or more CEs, and a relay device P connecting the PEs. A user 1 and a user 2 are users using the VPN infrastructure. CEs of the user 1 are CEs #1_1 to 1_4. CEs of the user 2 are CEs #2_1 to 2_4.

Overview

FIG. 5 illustrates an example in which a control apparatus 300 according to the present invention is implemented in the network example of FIG. 1. The control apparatus 300 sets the calculated end-to-end monitoring setting to every apparatus in the network, and outputs an affected user and a link state based on the end-to-end monitoring state information received from every apparatus in the network.

FIG. 6 illustrates an example of a configuration of the control apparatus 300 according to the present invention. Further, in FIGS. 9 and 10, contents of the information stored in the user end database 11 and the end-to-end path database 12 are shown respectively.

An end-to-end monitoring protocol is any protocol for confirming communication normality, such as Ether-CC or Ping.

First, the setting function a will be described.

Setting Function α

Step 1

The monitoring end calculation unit 22 calculates the end-to-end monitoring based on the user end database 11 and the end-to-end path database 12, and updates the end-to-end monitoring database 21. A formulation example of the problem in the present embodiment is shown in Expressions A of FIG. 15. Further, FIG. 11 shows a description of parameters used in Expressions A. The values of the parameters set and calculated in the example of the present embodiment are represented in [Math. a] to [Math. h].

[Math. a]

$$U=[\text{'user \#1','user \#2'}] \qquad \text{Equation a}$$

[Math. b]

$$V_1=[\text{'ce1\_1','ce1\_2','ce1\_3','ce1\_4'}] \qquad \text{Equation b}$$

[Math. c]

$$V_2=[\text{'ce2\_1','ce2\_2','ce2\_3','ce2\_4'}] \qquad \text{Equation c}$$

[Math. d]

$$E=[\text{link \#1,link \#2,link \#3,link \#4,link \#5,link \#6,link \#7,link \#8,link \#9,link \#10 link \#11,link \#12,link \#13}] \qquad \text{Equation d}$$

Parameter Setting Example

FIG. 11 shows parameters used in the formulation example of the present embodiment. Based on the user end database 11, U representing a set of users is set as represented in Equation a. Based on the user end database 11, V representing a set of CEs of every user is set as represented in Equations b and c. Based on the end-to-end path database 12, E representing a set of links is set as represented in Equation d.

Formulation Example of End-to-End Monitoring Calculation

Expressions and Equations A provides a formulation example of a problem in which resources are minimized while the conditions (A) are satisfied. A meaning of each of expressions in Expressions and Equations A is described below.

Expression 1: A sum of monitoring ends is set as an objective function to solve the minimization problem.

Expression 2: Corresponds to the condition of "monitoring at least one user communication" in the conditions (A).

End-to-end monitoring is designed so that every CE always has at least one monitoring end.

Expression 3: Corresponds to the condition of "determining an upper limit of monitoring resources in every CE" in the conditions (A).

An appropriate upper limit value b is determined for every CE. Here, an upper limit value of 3 is determined for all the CEs.

Equation 4: see FIG. 11.

Expression 5: see FIG. 11.

Equation 6: An expression for calculating an end-to-end monitoring path routing matrix X that indicates a link (considering only an identifiable link) to be passed for every end-to-end monitoring path.

Equation 7: In an end-to-end monitoring routing matrix X, if the column vectors are linearly independent, combinations of the monitoring path passing through each of the links are different. Consequently, a condition is that the rank of X is the number of identifiable links.

Figure 7:
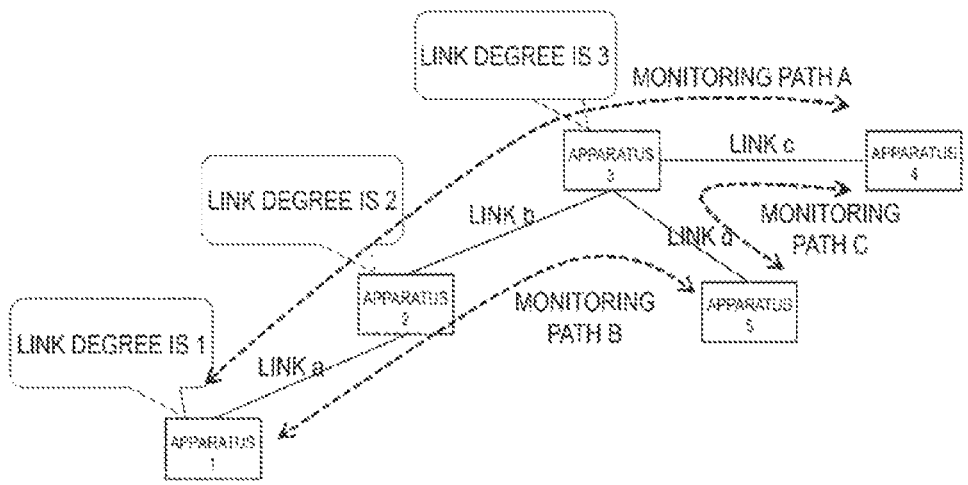
FIG. 7 is a diagram for describing a principle that a link is identified from a monitoring path.

An example of identifiable links is described in FIG. 7. Here, an apparatus 1, an apparatus 4, and an apparatus 5 are assumed to be a CE. End-to-end monitoring is assumed to be performed between the apparatuses 1 and 4, the apparatuses 1 and 5, and the apparatuses 4 and 5 for which a monitoring path A, a monitoring path B, and a monitoring path C are defined respectively.

In the monitoring path A, links a and b are common with the monitoring path B, link c is common with the monitoring path C, and all links of the monitoring path A are common with the monitoring path B or the monitoring path C, and thus, the monitoring path A alone is not disconnected. Similarly, only one of the monitoring paths B and C is not disconnected.

Consequently, if the monitoring path A and the monitoring path B are disconnected, it is found that any one of the common links a and b is interrupted. If the monitoring path A and the monitoring path C are disconnected, it is found that the common link c is interrupted. If the monitoring path C and the monitoring path B are disconnected, it is found that a common link d is interrupted. There is no link that is common to all of the monitoring path A, the monitoring path B, and the monitoring path C, and thus, if the monitoring path A, the monitoring path B, and the monitoring path C are disconnected, it is presumed that the cause is not a link failure.

Thus, a state of the links a and b cannot be identified from the result of the end-to-end monitoring. The link state cannot be identified because each of the links can pass only a combination of the same monitoring paths. Each of the links can pass only a combination of the same monitoring paths because there is no branch in a device 2.

Consequently, a link connecting only to a node having a link degree of 2 or less cannot be identified. Equation e represents a set of links connecting only to a node having a link degree of 2 or less in the example of the present embodiment.

[Math. e]

$$\overline{E} = [\text{link \#6, link \#7, link \#8, link \#9, link \#10, link \#11, link \#12, link \#13}] \quad \text{Equation e}$$

Equation h represents the end-to-end monitoring path routing matrix X calculated based on Equations f and g.

[Math. f]

$$R = \begin{array}{l}(\text{'ce1\_1','ce1\_2'})[1\ 1\ 0\ 0\ 0\ 1\ 0\ 0\ 0\ 0\ 0\ 0] \\ (\text{'ce1\_1','ce1\_3'})[1\ 0\ 1\ 0\ 1\ 1\ 0\ 0\ 0\ 0\ 0\ 0] \\ (\text{'ce1\_1','ce1\_4'})[1\ 0\ 0\ 1\ 1\ 1\ 0\ 0\ 0\ 0\ 0\ 0] \\ (\text{'ce1\_2','ce1\_3'})[0\ 1\ 1\ 0\ 1\ 0\ 0\ 0\ 0\ 0\ 0\ 0] \\ (\text{'ce1\_2','ce1\_4'})[0\ 1\ 0\ 1\ 1\ 0\ 0\ 0\ 0\ 0\ 0\ 0] \\ (\text{'ce1\_3','ce1\_4'})[0\ 0\ 1\ 1\ 0\ 0\ 0\ 0\ 0\ 0\ 0\ 0] \\ (\text{'ce2\_1','ce2\_2'})[1\ 1\ 0\ 0\ 0\ 0\ 0\ 0\ 1\ 0\ 0\ 0] \\ (\text{'ce2\_1','ce2\_3'})[1\ 0\ 1\ 0\ 1\ 0\ 0\ 0\ 0\ 0\ 0\ 0] \\ (\text{'ce2\_1','ce2\_4'})[1\ 0\ 0\ 1\ 1\ 0\ 0\ 0\ 0\ 0\ 0\ 0] \\ (\text{'ce2\_2','ce2\_3'})[0\ 1\ 1\ 0\ 1\ 0\ 0\ 0\ 1\ 0\ 0\ 0] \\ (\text{'ce2\_2','ce2\_4'})[0\ 1\ 0\ 1\ 1\ 0\ 0\ 0\ 1\ 0\ 0\ 0] \\ (\text{'ce2\_3','ce2\_4'})[0\ 0\ 1\ 1\ 0\ 0\ 0\ 0\ 0\ 0\ 0\ 0] \end{array} \quad \text{Equation f}$$

[Math. g]

$$x = (\text{'ce1\_1','ce1\_2'})[0]\ (\text{'ce1\_1','ce1\_3'})[1]\ (\text{'ce1\_1', 'ce1\_4'})[0]\ (\text{'ce1\_2','ce1\_3'})[0]\ (\text{'ce1\_2', 'ce1\_4'})[1]\ (\text{'ce1\_3','ce1\_4'})[0]\ (\text{'ce2\_1', 'ce2\_2'})[1]\ (\text{'ce2\_1','ce2\_3'})[0]\ (\text{'ce2\_1', 'ce2\_4'})[0]\ (\text{'ce2\_2','ce2\_3'})[1]\ (\text{'ce2\_2', 'ce2\_4'})[0](\text{'ce2\_3','ce2\_4'})[1] \quad \text{Equation g}$$

[Math. h]

$$X = (\text{'ce1\_1','ce1\_3'})[1\ 0\ 1\ 0\ 1]\ (\text{'ce1\_2','ce1\_4'})[0\ 1\ 0\ 1\ 1]\ (\text{'ce2\_1','ce2\_2'})[1\ 1\ 0\ 0\ 0]\ (\text{'ce2\_2', 'ce2\_3'})[0\ 1\ 1\ 0\ 1](\text{'ce2\_3','ce2\_4'})[0\ 0\ 1\ 1\ 0] \quad \text{Equation h}$$

For example, in Equation g, an element (ce1_1, ce1_3) indicating whether end-to-end monitoring is performed between the CE #1_1 and the CE #1_3 is 1 (second line). An element (ce1_1, ce1_3) of Equation f and an element corresponding to links after removing links of the link set of Equation e (that is, a first column to a fifth column on a second row of R) are substituted for the element (ce1_1, ce1_3) indicating the end-to-end monitoring path between the CE #1_1 and the CE #1_3 in Equation h. The same applies to the other elements.

The problem of the formulation example (Expressions and Equations A) is solved, and the end-to-end monitoring database 21 is updated based on the calculated value of x (Equation g) as shown in FIG. 12. For example, the element (ce1_1, ce1_3) of x is 1, and thus, the end pairs CE #1_1 and CE #1_3 are assigned to end-to-end monitoring #1 in FIG. 12. The same applies to the other elements.

Step 2

The end-to-end monitoring path calculation unit 24 updates the end-to-end monitoring path database 23 based on the end-to-end monitoring database 21 and the end-to-end path database 12. Based on the end-to-end monitoring database 21 in FIG. 12 and the end-to-end path database 12 in FIG. 10, the end-to-end monitoring path database 23 is set as shown in FIG. 13. For example, referring to FIG. 12, the end pair in the end-to-end monitoring #1 is the CE #1_1 and the CE #1_3. Further, referring to FIG. 10, the links passed between the CE #1_1 and the CE #1_3 are a link #1, a link #3, a link #5, a link #6, and a link 10. Consequently, the end-to-end monitoring path of the end-to-end monitoring #1 passes through the link #1, the link #3, the link #5, the link #6, and the link 10. The example of the end-to-end monitoring path database 23 in FIG. 13 includes only links identifiable based on Equations d and e.

Step 3

The end-to-end monitoring setting unit 25 sets the end-to-end monitoring in a CE based on the end-to-end monitoring database 21.

The end-to-end monitoring setting unit 25 sets end monitoring to each of the CEs based on the end-to-end monitoring database 21 in FIG. 12. For example, in end monitoring #1, an Ether-CC to the CE #1_3 is set to the CE #1_1, and an Ether-CC to the CE #1_1 is set to the CE #1_3. The same applies to other end-to-end monitoring processes.

Figure 4:
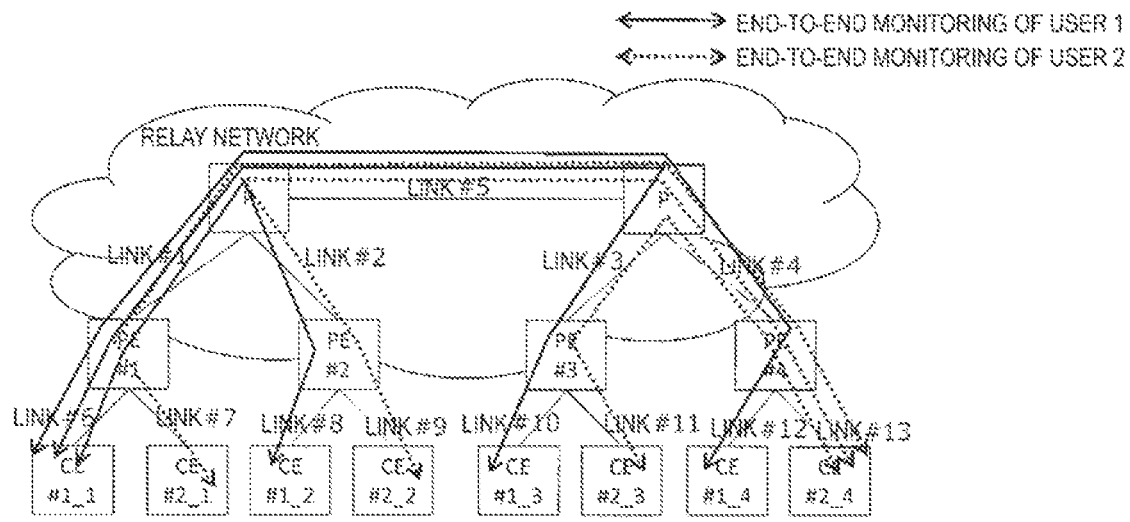
FIG. 4 is a diagram for describing end-to-end monitoring related to the present invention.
Figures 8, 9:
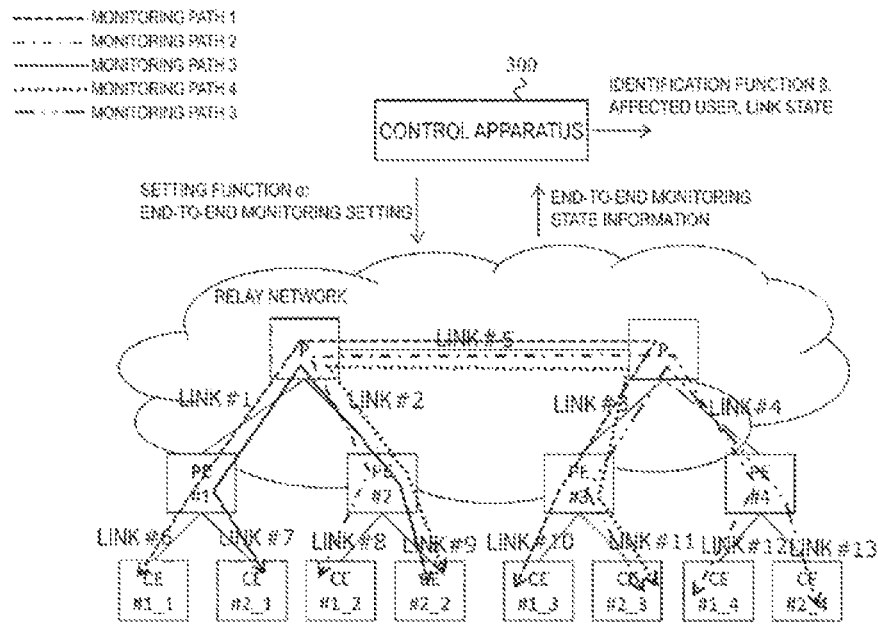
FIG. 8 is an example of a monitoring path set by the control apparatus according to the present invention.
FIG. 9 is an example of information stored in a user end database.

A setting example is illustrated in FIG. 8. Compared with an example known in the art in FIG. 4 where end monitoring is set for each of the users, the total end monitoring count can be reduced.

Identification Function β

Next, the identification function β will be described.

An example of an event in which a link failure occurs in a link 1 will be described. In the present event example, the link 1 is identified as a failed link, and the users 1 and 2 are identified as users affected by the failed link, from a result of the end-to-end monitoring set by the present control apparatus.

Step 1

The end-to-end monitoring result processing unit 26 receives end-to-end monitoring state information.

For example, the end-to-end monitoring result processing unit 26 receives information about a disconnection of a monitoring path 1 and a monitoring path 3 from the network.

Step 2

The end-to-end monitoring result processing unit 26 identifies a failed link.

The end-to-end monitoring result processing unit 26 calculates a link included only in the monitoring path 1 and the monitoring path 3, based on the end-to-end monitoring path database 23 in FIG. 13. The link included only in the monitoring path 1 and the monitoring path 3 is the link #1. Consequently, the end-to-end monitoring result processing unit 26 identifies the link #1 as the disconnected link.

The reason why the failed link can be identified is that the combinations of the monitoring path passing through each of the links are coprime in all of the links. Specifically, the reason is that in Equation 7 of Expressions and Equations A, a condition is provided in which the column vectors of the routing matrix of the end-to-end monitoring path are linearly independent.

Here, the identification of a failed link will be described with reference to FIG. 14. As described in FIG. 8, five links are monitored. There are also five monitoring paths set. Circles indicate links through which each of the monitoring paths passes. For example, if the end-to-end monitoring result processing unit 26 detects a disconnection of the monitoring paths #1, #4, and #5, a link 3 can be identified as a failed link from FIG. 14. That is, the combinations of the monitoring path passing through each of the links are coprime, and thus, it is possible to identify the failed link from the combination of disconnected monitoring paths, and improve a monitoring performance without performing end-to-end monitoring between all the CEs.

Step 3

The end-to-end monitoring result processing unit 26 identifies an affected user. If it is determined that the link disconnected in step 2 is the link #1, the end-to-end monitoring path passing through the link #1 is obtained based on the end-to-end path database 12 in FIG. 10. For example, the paths in sections (CE #1_1, CE #1_2), (CE #1_1, CE #1_3), (CE #1_1, CE #1_4), . . . pass through the link #1.

Next, a user included in the sections is determined from the user end database 11 in FIG. 9. In the example of the present embodiment, both the user 1 and the user 2 utilize the path passing through the link #1, and thus, the user 1 and the user 2 are affected by the failed link. The control apparatus 300 notifies a network administrator or the like of the failed link #1 and the user affected by the failed link #1.

Effects of Invention

According to the present invention, it is possible to provide a control apparatus and a control system including a means for setting end-to-end monitoring so that resources are reduced while the conditions (A) are considered, and a means for determining a user affected by a change in a link state and a state of a certain link.

INDUSTRIAL APPLICABILITY

A network apparatus and a network system according to the present disclosure can be applied to the information communication industry.

REFERENCE SIGNS LIST

11: User end database
12: End-to-end path database
13: End-to-end monitoring management unit
21: End-to-end monitoring database
22: Monitoring end calculation unit
23: End-to-end monitoring path database
24: End-to-end monitoring path calculation unit
25: End-to-end monitoring setting unit
26: End-to-end monitoring result processing unit
300: Control apparatus

The invention claimed is:

1. A control apparatus for controlling an end-to-end monitoring in a virtual private network (VPN) infrastructure in which communications of a plurality of users are superimposed, the control apparatus comprising:
a user end database that stores information about customer edge apparatuses (CEs) for each of the plurality of users, the customer edge apparatuses (CEs) serving as monitoring ends of the end-to-end monitoring;
an end-to-end path database that stores information about all of first links included in a path between the CEs;
a processor; and
a storage medium having computer program instructions stored thereon, when executed by the processor, perform to: set a monitoring path for the end-to-end monitoring to between the CEs so that a combination of the monitoring path passing through each of the first links are coprime.

2. The control apparatus according to claim 1, wherein the computer program instructions further perform to receive, from the CEs serving as the monitoring ends, end-to-end monitoring state information indicating whether the monitoring path is disconnected to perform an identification of a failed link and a user affected by the failed link, based on the combination of the monitoring path that is disconnected.

3. The control apparatus according to claim 2, wherein the computer program instructions further perform to
calculate end pairs being combinations of the CEs between which the end-to-end monitoring is performed, so to satisfy an upper limit of the number of monitoring ends to store the end pairs in an end-to-end monitoring database;
calculate, based on information about the first links stored in the end-to-end path database and information about the end pairs stored in the end-to-end monitoring database, second links included in the monitoring path being a path between each of the end pairs, for each of the end pairs to store the second links in an end-to-end monitoring path database;
set, based on information about the second links included in the monitoring path stored in the end-to-end monitoring database, an end-to-end monitoring to each of the CEs so that the combination of the monitoring path passing through each of the second links are coprime; and
achieve the identification by comparing the end-to-end monitoring state information, information about the CEs stored in the user end database, and information about the second links included in the monitoring path stored in the end-to-end monitoring path database.

4. A non-transitory computer-readable medium having computer-executable instructions that, upon execution of the instructions by a processor of a computer, cause the computer to function as the control apparatus according to claim 1.

5. A control method for controlling an end-to-end monitoring in a VPN infrastructure in which communications of a plurality of users are superimposed, the control method comprising:
using, by an end-to-end monitoring management unit, information about CEs for each of the plurality of users, the CEs serving as monitoring ends of the end-to-end monitoring, stored in a user end database and information about all of first links included in a path between the CEs stored in an end-to-end path database to set a monitoring path for the end-to-end monitoring to between the CEs so that a combination of the monitoring path passing through each of the first links are coprime.

6. The control method according to claim 5, further comprising: receiving, from the CEs serving as the monitoring ends, end-to-end monitoring state information indicating whether the monitoring path is disconnected to perform an identification of a failed link and a user affected by the failed link, based on the combination of the monitoring path that is disconnected.

7. The control method according to claim 6, further comprising:
calculating, by the end-to-end monitoring management unit, end pairs being combinations of the CEs between which the end-to-end monitoring is performed, so to satisfy an upper limit of the number of monitoring ends to store the end pairs in an end-to-end monitoring database;
calculating, by the end-to-end monitoring management unit, based on information about the first links stored in the end-to-end path database and information about the end pairs stored in the end-to-end monitoring database, second links included in the monitoring path being a path between each of the end pairs, for each of the end pairs to store the second links in an end-to-end monitoring path database; and
setting, by the end-to-end monitoring management unit, based on information about the second links included in the monitoring path stored in the end-to-end monitoring database, an end-to-end monitoring to each of the CEs so that the combination of the monitoring path passing through each of the second links are coprime,
wherein the identification includes comparing the end-to-end monitoring state information, information about the CEs stored in the user end database, and information about the second links included in the monitoring path stored in the end-to-end monitoring path database.

* * * * *